United States Patent
Fischer et al.

(10) Patent No.: US 12,425,421 B2
(45) Date of Patent: Sep. 23, 2025

(54) SYSTEMS AND METHODS FOR ANALYZING AND CONTROLLING NETWORK TRAFFIC

(71) Applicant: Siemens Aktiengesellschaft, Munich (DE)

(72) Inventors: Jan-Gregor Fischer, Zorneding (DE); Michael Leipold, Nuremberg (DE); Michal Skubacz, Gröbenzell (DE)

(73) Assignee: Siemens Aktiengesellschaft, Munich (DE)

( * ) Notice: Subject to any disclaimer, the term of this patent is extended or adjusted under 35 U.S.C. 154(b) by 154 days.

(21) Appl. No.: 18/288,739

(22) PCT Filed: Apr. 26, 2022

(86) PCT No.: PCT/EP2022/060947
§ 371 (c)(1),
(2) Date: Oct. 27, 2023

(87) PCT Pub. No.: WO2022/229125
PCT Pub. Date: Nov. 3, 2022

(65) Prior Publication Data
US 2024/0223580 A1   Jul. 4, 2024

(30) Foreign Application Priority Data
Apr. 28, 2021 (EP) .................................... 21170964

(51) Int. Cl.
*H04L 9/40* (2022.01)
(52) U.S. Cl.
CPC ................................ *H04L 63/1416* (2013.01)
(58) Field of Classification Search
CPC .................................................. H04L 63/1416
See application file for complete search history.

(56) References Cited

U.S. PATENT DOCUMENTS

| 10,701,035 B2 | 6/2020 | Chan et al. |
| 2018/0300124 A1 | 10/2018 | Malladi et al. |
| 2021/0089886 A1* | 3/2021 | Lin ........................ G06V 10/70 |

FOREIGN PATENT DOCUMENTS

CN        105204487 A      12/2015

OTHER PUBLICATIONS

PCT International Search Report and Written Opinion of International Searching Authority mailed Jul. 7, 2022 corresponding to PCT International Application No. PCT/EP2022/060947 filed Apr. 26, 2022.

* cited by examiner

*Primary Examiner* — Brian Whipple
(74) *Attorney, Agent, or Firm* — Henry M. Feiereisen LLC

(57) ABSTRACT

A system for analyzing and controlling network traffic associated with at least one device that resides between a first network and a second network includes a processor that is operatively coupled to a memory and configured to execute a policy definition authority component and a network traffic analyze-control-component. The policy definition authority component is configured to provide, to the network traffic analyze-control-component, a first data analytics model and a second data analytics model. The network traffic analyze-control-component is configured to receive an input data representative of the network traffic, apply first data analytics model to the input data. The first data analytics model identifies a network traffic situation, applies the second data analytics model to the network traffic situation. The second data analytics model generates a rule according to which the network traffic can be controlled, and controlling the network traffic according to the at least one rule.

13 Claims, 4 Drawing Sheets

SYSTEMS AND METHODS FOR ANALYZING AND CONTROLLING NETWORK TRAFFIC

CROSS-REFERENCES TO RELATED APPLICATIONS

This application is the U.S. National Stage of International Application No. PCT/EP2022/060947, filed Apr. 26, 2022, which designated the United States and has been published as International Publication No. WO 2022/229125 A1 and which claims the priority of European Patent Application, Serial No. 21170964.7, filed Apr. 28, 2021, pursuant to 35 U.S.C. 119(a)-(d).

BACKGROUND OF THE INVENTION

The subject matter disclosed herein relates to systems and methods for analyzing and controlling network traffic associated with at least one device that resides between a first network and a second network.

Furthermore, the subject matter disclosed herein relates to a computer program and to a computer-readable medium carrying the computer program.

Edge computing enriches automation control with digital industrial applications close to the shop floor, in particular at the shop floor. This means close to industrial machines, actuators and other equipment. While adding new functionalities such as increased production transparency and optimization, predictive maintenance, condition monitoring and visual awareness, it also—by definition—represents a man-in-the-middle between operational and information technologies that must be carefully protected for platform stability, data privacy and other IT-security reasons. This aspect becomes even more important in case of open application ecosystems that allow OEMs, customers and $3^{rd}$ parties to deploy and run own applications on the edge and/or IIoT (Industrial Internet of Things) devices close to production-critical assets analyzing data and feeding back information to the operational equipment influencing production-related control flows. On the one hand both valid application scenarios, production control and data privacy must not be negatively affected while at the same time the scope and flexibility of Edge application scenarios shall not be reduced without explicit transparency and control.

In such Edge ecosystems the problem to be solved is to allow for flexible extension of traditional shop floor functions by applications from third parties, and—at the same time—protecting the operator's production processes, hardware assets, data privacy and additionally stability of Edge platform and Edge applications even in case of presence of erroneous or malicious applications or external malicious threats.

One aspect of this problem is a need for means for data and data traffic control, which can enable the required protection in open application ecosystem approaches for Edge computing.

Regarding the data traffic control, it is necessary to correctly assess and distinguish between different types of network traffic, so that both the protection of operator's production processes, hardware assets, data privacy and the stability of Edge platform and Edge applications even in case of presence of erroneous or malicious applications or external malicious threats.

One possible approach is to apply a network bandwidth throttling approach. There, a quota-oriented transfer buffer that controls network link bandwidth over time allowing for time-limited traffic bursts, limiting traffic to a restricted upper bound network bandwidth and refilling the burst buffer over time if traffic bandwidth is not fully utilized. This strategy allows to continuously run traffic related to e.g. high frequency data while at the same time allowing bandwidth-limited continuous or time-bounded bursts for other traffic with several limitations.

The strategy shows a multitude of drawbacks and limitations. It cannot strictly distinguish between different continuous and burst traffics on the same network channels but assesses the union of all kinds of traffic over each channel at the same time. The control mechanism's boundary properties and thresholds are not dynamic as the real usage scenarios cannot be understood in an automated manner in form of a combined scenario formed by the individual traffic contributions.

Using this tradition approach it is not possible to distinguish between different types of traffic in case the traffic characteristics are resembling. In dynamic network link scenarios valid type-1 traffic may even be analyzed as a false-positive (type-2/malicious traffic) and throttled down as the required intelligence for situation understanding is missing. The same refers to type-2 traffic scenarios, whereat these are more error-prone in this aspect as they often occur in dynamic situations when Edge applications initiate ad-hoc type-2 network communication such as a best-effort download of a very big image or of report not fitting into the burst bandwidth quota and thus throttled down leading to customer dissatisfaction about improper platform networking qualities.

Another solution approach is known from the digital right management (DRM) context (e.g. https://www.capgemini.com/2015/11/drm-for-things-managing-rights-and-permissions-for-iot, https://link.springer.com/article/10.1007/s11042-020-08683-2). Here, critical data is protected by applying digital cryptography in combination with a usage license. Though the approach can protect from unauthorized data access it cannot solve the problem of correctly handling mixed type-1 and type-2 traffic situations in case the protected data cannot be classified properly. DRM systems are also hard to integrate and maintain (DRM license management on customer premises), and lead to increased costs for development, testing and necessary licensing of a DRM runtime.

Therefore, a sustainable and reliable solution for the above problem is needed.

SUMMARY OF THE INVENTION

In order to achieve this objective, the present invention provides a system for analyzing and controlling network traffic associated with at least one device that resides between a first network and a second network, said system comprising a memory that stores machine-executable components, a processor that is operatively coupled to the memory, and is configured to execute the machine-executable components, wherein the machine-executable components comprise a policy definition authority component and a network traffic analyze-control-component, wherein the policy definition authority component is configured to provide, to the network traffic analyze-control-component, at least one first data analytics model and at least one second data analytics model, the network traffic analyze-control-component is configured to receive an input data representative of the network traffic, apply or run the at least one first data analytics model to the input data, wherein the at least one first data analytics model identifies at least one network traffic situation, apply the at least one second data analytics model to the at least one network traffic situation, wherein the at least one second data analytics model generates at least one rule according to which the network traffic can be controlled, control the network traffic according to the at least one rule.

The system is, therefore, a situation-aware decision system for analyzing and controlling the network traffic, provides means for data and data traffic control and thus enables the required protection in open application ecosystem approaches for Edge computing.

It enables a proper identification of different classes (situations) of network transfers and a correct assessing and distinguishing between different types of network traffic.

For example, type-1 traffic can be a traffic of potentially time-critical (w.r.t. shopfloor functionality) importance for the functionality of the system including critical Edge applications based on must-have network traffic scenarios (e.g. Edge-inbound traffic with high frequency, high quality motion control or drive train data) as basis for operations. Improper context-awareness of a networking situation and inadequate controllability may negatively affect data security and/or stability of the Edge computing platform and applications in terms of network-load characterized by data frequency and bandwidth, jitter and latency.

Type-1 traffic must be correctly classified, e.g. to distinguish between a valid high frequency machine tool data transfer and an invalid overload situation such as an erroneous Edge application running high frequency traffic congesting I/O resources and leading to a potential unavailability of critical functions.

Type-2 traffic can be all other network traffic that is not time-critical for Edge computing functions such as best-effort data imports from customer systems (e.g. maintenance tasks), best-effort imports of background information for improving data analysis (e.g. external CAD/CAM models), or best-effort Web-based access for accessing data from Ecosystem applications running on the Siemens IIOT/Edge computing platforms (e.g. downloads of 2D/3D graphs and PDF reports). As the combination of multiple type-2 traffic requests may lead to a type-1 traffic situation it is important to correctly understand and assess the contribution of each single traffic to an overall network traffic situation including erroneous and potentially malicious network traffic.

The system can, therefore, guarantee data transfers related to a first type of traffic (type-1 above) while allowing as much as possible flexibility of data transfers related to a second type of traffic (type-2 above) and detecting and isolating invalid traffic scenarios at the same time.

In an embodiment, the network traffic associated with the at least one device can be a network traffic inbound to, a network traffic on and a network traffic outbound from the at least one device.

In an embodiment, the input data comprises a network traffic data and a network traffic context data representative of a context within which the network traffic occurs, wherein the at least one first data analytics model performs a context-based identification of the at least one network traffic situation.

Hence the system allows a context-based understanding of the overall traffic situation and fine-granular control over individual network links to overcome the limitations described above.

This context-based approach for situation understanding and flexible control strategies helps to reduce false-positive reasoning results in prior art approaches.

In an embodiment, the network traffic data can comprise at least one of bandwidth, jitter, frequencies of data loss, latencies, network protocol.

In an embodiment, the network traffic context data can comprise at least one of identification of a user that initiates the network traffic, license information associated with the network traffic, information associated with system environment (production or test), outside temperature.

In an embodiment, the network traffic analyze-control-component comprises a network traffic analyzer component and a network traffic controller component, wherein the network traffic analyzer component is configured to apply/to run the at least one first data analytics model to the input data, and the network traffic controller component is configured to apply the at least one second data analytics model to the at least one network traffic situation and to control the network traffic according to the at least one rule.

In an embodiment, the first data analytics model and/or second data analytics model are/is trained or defined on historical network traffic data.

In an embodiment, the at least one first data analytics model analyses statistical and/or stochastic and/or temporal correlations of the network traffic to identify the at least one network traffic situation.

In an embodiment, the at least one network traffic situation comprises streaming continuous high-frequency sensor data from the first network to the system and/or requesting, by the second network, a file download from the system.

In an embodiment, the first data analytics model and/or second data analytics model are/is based on or comprise a rule engine, complex event processing engine, constraint reasoner, temporal logic reasoner, description logics reasoner, simulation-based analyzer, statistical reasoner, mathematical optimizer, neural network classifier or on a combination of one or multiple thereof.

In an embodiment, the network traffic analyze-control-component is configured to receive the input data continuously in an input data stream and/or in form of batches of input data, for example, each microsecond, millisecond, second or minute, and, while receiving the input data, run the at least one first data analytics model on the input data, wherein the at least one first data analytics model determines correlations between the network traffic and a past and/or a current and/or an anticipated/predicted network traffic (to identify the at least one network traffic situation).

The system using the network traffic context data provides a generic and flexible mechanism (in terms of increased usability for application code developers) for protecting sensible data as it does not distinguish between "restricted" and "unrestricted" data but assesses and controls all kinds of type-1 and type-2 network traffic in the same homogeneous way by understanding the full situational context between inbound, outbound and on-device network traffic over time.

Therefore, the system can actively control inbound, outbound and on-device network traffic in dependence on the integrated analysis of past, current and anticipated situations of single and combined traffic scenarios. These scenarios can be correlated in order to derive information about system and network stability and data privacy based on historic, current and/or simulated data.

In an embodiment, the network traffic analyze-control-component comprises or configured to access a data repository (e.g. a file or database) for storing historic network traffic metrics and/or statistics that are used for improving the identification quality based on historical information.

In order to achieve the above-mentioned objective, the present invention also provides a computer implemented method for analyzing and controlling network traffic associated with at least one device that resides between a first network and a second network, said system comprising a memory that stores machine-executable components, a processor that is operatively coupled to the memory, and is configured to execute the machine-executable components, wherein the machine-executable components comprise a policy definition authority component and a network traffic analyze-control-component, the method comprising:

provide, by the policy definition authority component, at least one first data analytics model and at least one second data analytics model to the network traffic analyze-control-component, receiving, by the network traffic analyze-control-component, an input data representative of the network traffic, applying, by the network traffic analyze-control-component, the at least one first data analytics model to the input data, wherein the at least one first data analytics model identifies at least one network traffic situation, applying, by the network traffic analyze-control-component, the at least one second data analytics model to the at least one network traffic situation, wherein the at least one second data analytics model generates at least one rule according to which the network traffic can be controlled, controlling, by the network traffic analyze-control-component, the network traffic according to the at least one rule.

BRIEF DESCRIPTION OF THE DRAWING

The above and other objects and advantages of the invention will be apparent upon consideration of the following detailed description of certain aspects indicating only a few possible ways which can be practiced. The description is taken in conjunction with the accompanying drawings, in which like reference characters refer to like parts throughout, and in which.

DETAILED DESCRIPTION OF PREFERRED EMBODIMENTS

Figure 1:
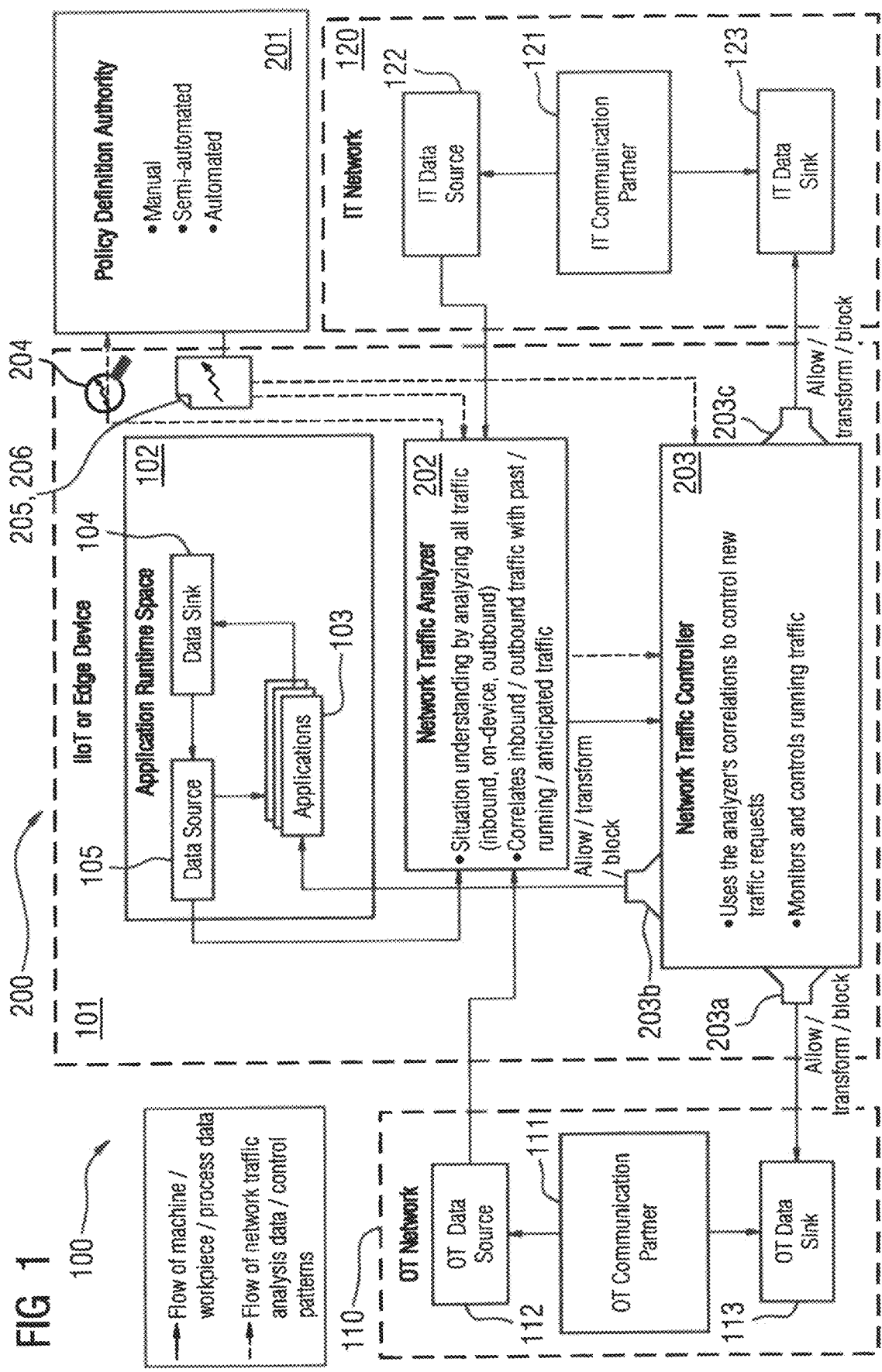
FIG. 1 a block diagram illustrating a computing system that may be used to facilitate communication between an OT- and an IT-network, FIG. 2 a block diagram of FIG. 1 according to one possible embodiment, FIG. 3 a block diagram of FIG. 1 according to one possible embodiment, FIG. 4 a flow diagram of a method that can be carried out by a network traffic control system, and FIG. 5 computer-readable medium with a computer program.

The computing system 100 of FIG. 1 comprises one or more IIoT (Industrial Internet of Things) or edge devices 101, an OT (Operational Technology) network 110, an IT network 120 and a network traffic control system 200.

For the sake of simplicity and where it is appropriate, the one or more IIOT or edge devices are referred to below as device 101. The device 101 resides between the OT network 110 and the IT network 120.

The OT network 110 may comprise one or more OT devices 111 such as industrial sensors and automation controllers. Each OT device 111 can be designed to communicate with other devices in the OT network 110 and with one or more of the IIoT/Edge Devices 101. Some of the OT devices can be designed as and serve as OT data sources 112 providing data (e.g. automation data and/or sensor signals) or OT data sinks 113 receiving data (e.g. automation control input and sensor and/or automation configuration data) or a combination thereof. Data sources can be referred to as data providers, data sinks can be referred to as data consumers and a combination thereof can be referred to as data prosumers.

The IT network 120 can comprise IT equipment such as Manufacturing Execution Systems (MES), Enterprise Resource Planning (ERP) systems, Computerized Maintenance Management Systems (CMMS), databases or data lakes on premises or in a cloud. Each element 121 in the IT network 120 can be designed to communicate with other devices in the IT network 120 and with one or more of the IIOT/Edge Devices 101. The elements can be designed as and serve as IT data sources 122 providing data (e.g. MES and ERP data or maintenance tasks from a CMMS) or IT data sinks 123 receiving data (e.g. motor and workpiece quality data, predictive maintenance-related information or detected process anomalies) or a combination thereof (IT data prosumers).

The device 101 is configured to establish connection between the OT 110 and IT networks 120 and to process data from both networks and/or data on the device 101 itself by routing between the networks and optionally to and from applications running on the device 101 (e.g. in the field of data analytics) close to the industrial equipment (e.g. a motor or a machine tool).

Each of the IIoT/edge devices 101 comprises an application runtime space 102 that can host and run one or more applications 103 (e.g. data analytics applications). The application runtime space 102 can be designed as runtime environment for the applications 103. Some of the applications 103 can be designed and serve as data sinks 104 and/or data sources 105.

The data sinks 104 can be configured to receive data inbound to the device 101 and data from the applications 103 running on the device 101.

The network traffic control system 200 comprises a policy definition authority component 201, a network traffic analyzer component 202, and a network traffic controller component 203. The network traffic analyzer component 202 and the network traffic controller component 203 can correspond to the network traffic analyze-control-component according to the invention.

Each of the components can be realized as a software and/or hardware component. For example, some of the components can be realized in form of ASICs (application-specific integrated circuits) integrated with a one or more of the IIOT/edge devices 101. In an embodiment some of the network traffic control system's components can be incorporated into a system-on-a-chip (SoC) which can be integrated with a one or more of the IIOT/edge devices 101.

In an embodiment each of the IIOT/edge devices 101 comprises a network traffic analyzer component 202 and a network traffic controller component 203 so that different network traffic analyzer components 202 and network traffic controller components 203 reside on different IIOT/edge devices 101.

The policy definition authority component 201 can reside on the device 101 (not shown) or on a server, for example on a backend-server, e.g. on an on-prem backend server or on a cloud backend server.

The policy definition authority component 201 can be configured to receive data 204 based on a network traffic data associated with one or more of the IIoT/edge devices 101 (device-specific network traffic data). This also can be a historical or a real-time data. The policy definition authority component 201 can also be configured to retrieve data from a data lake that contains historical network traffic data associated with one or more of the IIoT/edge devices 101. The data can be the device-specific network traffic data or, if requested for IT security reasons, pre-processed, anonymized/pseudonymized data characteristics about related network traffic properties. The data 204 is representative for different network traffic control scenarios or situations.

Furthermore, the policy definition authority component is configured to generate (or provide) at least one first and at least one second data analytics model 205, 206 based on the received data 204.

In an embodiment, the data 204 comprises device-specific network traffic data from different IIoT/edge devices 101 and the policy definition authority component 201 generates different first and second data analytics models 205, 206 for the different IIoT/edge devices 101.

The first data analytics model 205 and/or the second data analytics model 206 can be based on one or more neural networks. In this case the data 204 can serve as a training data for the neural networks.

The first and second data analytics models 205, 206 are designed or configured to be used to analyze and control device-specific network traffic in dependence on inbound network traffic to this device.

In an embodiment the first data analytics model 205 and/or second data analytics model 206 are/is based on or comprise a rule engine, complex event processing engine, constraint reasoner, temporal logic reasoner, description logics reasoner, simulation-based analyzer, statistical reasoner, mathematical optimizer, neural network classifier or on a combination of one or multiple thereof.

In an embodiment the first data analytics model 205 comprises a simulation-based analyzer and a neural network classifier. Int this case it is possible to classify network traffic situations based on anticipated/predicted network traffic.

In an embodiment, the policy definition authority component 201 can be configured to allow a manual, e.g. by a human being, definition of rules, constraints or other kind of policies, so that the first data analytics model 205 and/or the second data analytics model 206 can be designed as a manually definable set of rules.

In an embodiment, the policy definition authority component 201 can be configured to provide a computer-aided support for facilitating one or multiple tasks of manual definitions, e.g. supervised machine learning. In this case the first data analytics model 205 and/or the second data analytics model 206 can be designed as models based on a machine learning algorithm, e.g. on a neural network.

In an embodiment, the policy definition authority component 201 can be configured to generate the first data analytics model 205 and/or the second data analytics model 206 fully automatically, i.e. without human interaction, e.g. by utilizing unsupervised training. After generating the first data analytics model 205 and/or the second data analytics model 206 the policy definition authority component 201 may present the result to a user for acceptance.

The at least one first data analytics model 205 is transferred to the network traffic analyzer component 202 of a corresponding IIoT/edge device.

The at least one second data analytics model 206 is transferred to the network traffic controller component 203 of a corresponding IIOT/edge device.

The network traffic analyzer component 202 can reside at a IIOT/edge device or at one of the IIoT/edge devices 101 and is configured to receive an input data representative of the network traffic and to utilize the at least one first data analytics model 205 in order to identify at least one network traffic situation. In an embodiment the network traffic analyzer component 202 produces a description of the at least one network traffic situation.

The network traffic associated with the device 101 is network traffic inbound to, network traffic on and network traffic outbound from the device 101.

In an embodiment the input data comprises a network traffic data and a network traffic context data representative of a context within which the network traffic occurs. In this case the at least one first data analytics model 205 performs a context-based identification of the at least one network traffic situation.

Examples of the network traffic data comprise at least one of but not restricted to bandwidth, jitter, frequencies of data loss, latencies, network protocol etc.

Examples of the network traffic context data comprise at least one of but not restricted to identification of a user that initiates the network traffic, license information associated with the network traffic (e.g. whether the requesting party is allowed to use the network traffic), information associated with system environment (production or test), outside temperature.

Especially when the first and/or second data analytics model are based on a neural network or a machine learning algorithm the received input data can be used for training of new or for a further training of already existing models by the policy definition authority component 201. In this case it is transferred to the policy definition authority component 201 as the data 204.

To derive a network traffic situation the first data analytics model 205 is designed to apply statistical, stochastic and/or temporal correlations of the network traffic, i.e. the traffic inbound to and/or outbound from the one or more of the IIoT/edge devices 101 and/or the traffic on the one or more of the IIoT/edge devices 101 (on-device traffic).

The temporal correlations can be analyzed at a pre-determined point in time or over (a pre-determined period of) time.

In an embodiment the network traffic analyzer component 202 can be configured to receive the input data continuously in an input data stream and/or in form of batches of input data, for example, each microsecond, millisecond, second or minute. While receiving the input data, the network traffic analyzer component 202 can run the at least one first data analytics model 205 on the input data. During the runtime the least one first data analytics model 205 determines correlations between the network traffic and a past and/or a current and/or an anticipated/predicted network traffic. For example, the network traffic analyzer component 202 can be configured to store the input data at the beginning of the time period, for which the correlations will be analyzed, so that the past traffic can refer here to the traffic received within the said pre-determined period of time. In general, it is not to confuse with the historical network traffic. The anticipated network traffic can be produced for example by one of the above-mentioned machine-learning based algorithm, e.g. by a simulation-based analyzer.

Figure 2:
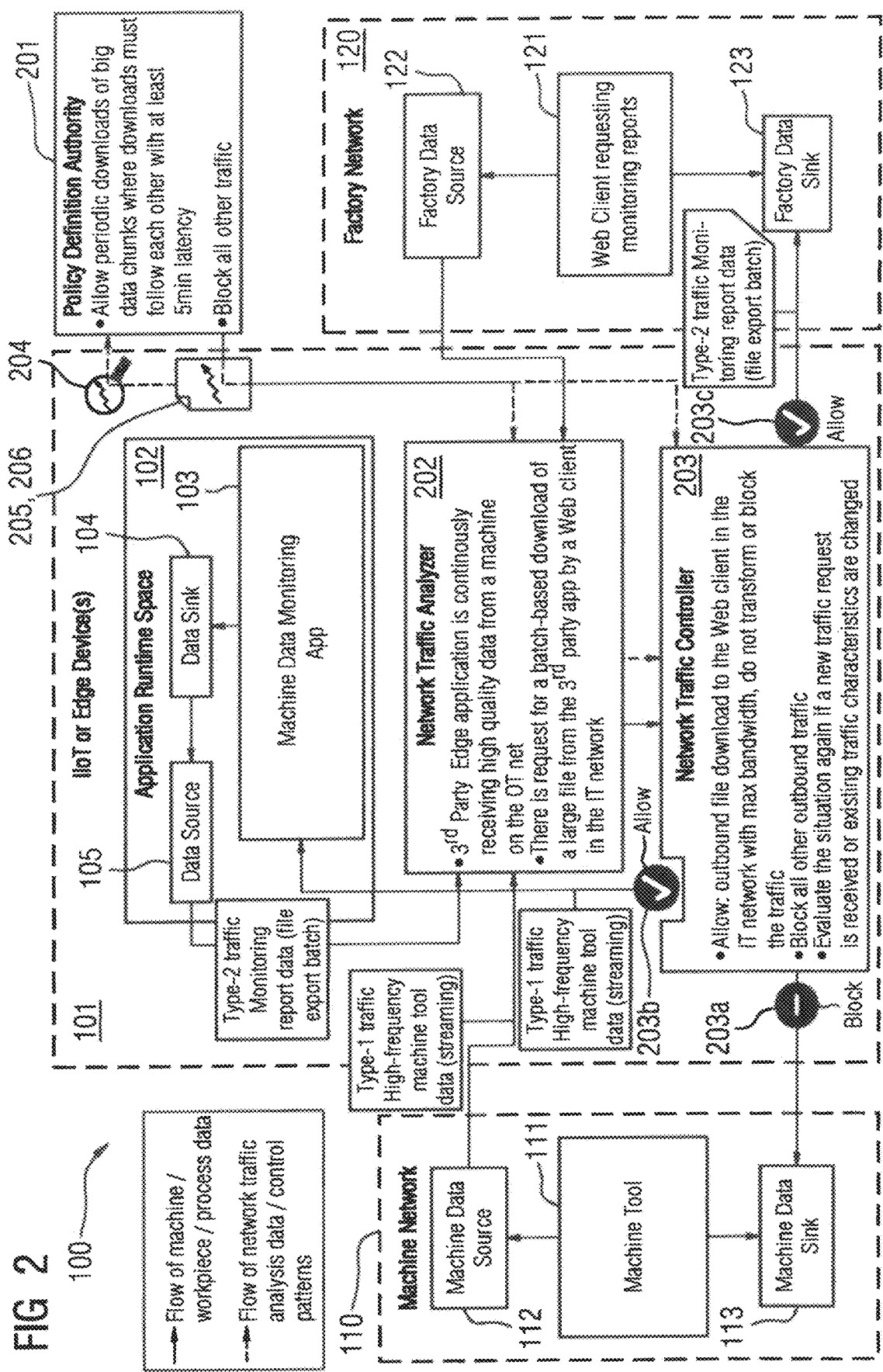

The output of the first data analytics model 205 can for example, be a continuous high-frequency sensor data streaming over the OT network 110 to the device 101 and/or an inbound request for a batch-based download of a large file from the 3rd party app by a Web client 121 in the IT network 120 (FIG. 2).

Figure 3:
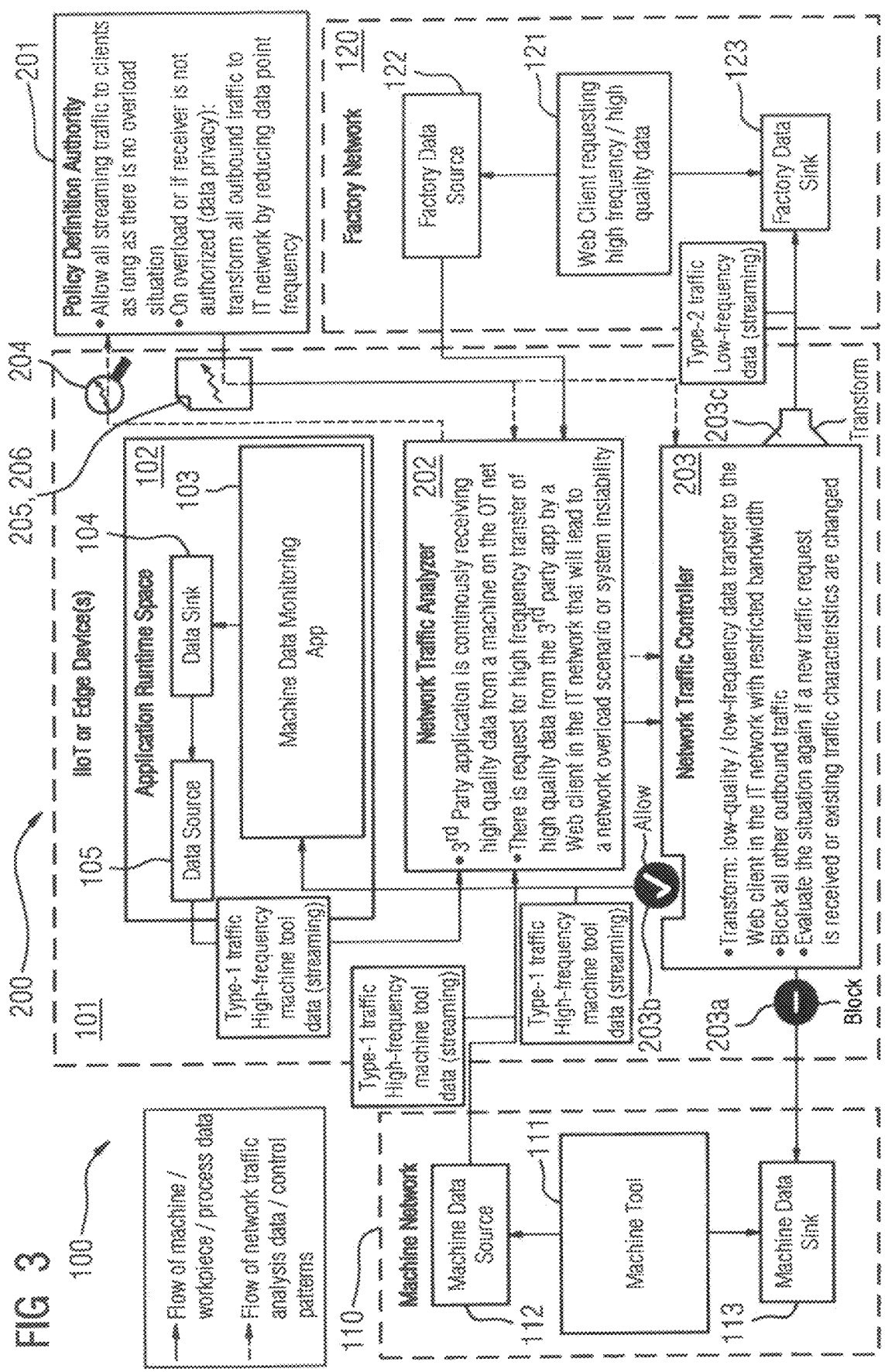

A further example of the at least one network traffic situation is a high-frequency (e.g. data point per 2 ms)

streaming of high-quality data from a specific device in the OT network 110 before receiving a request for downloading high-frequency-granular data exports to the IT network 120. In an embodiment the high-frequency streaming of high-quality data can be buffered, e.g. for several hours or for a day, on one of the IIoT/edge devices 101, before it will be transferred to the IT network 120 (FIG. 3).

Furthermore, the first data analytics model 205 can be used to assess incipient overload, system stability criticality and/or data privacy threats (e.g. if a receiver is not authorized to access a certain quality of industrial IoT data).

The network traffic analyzer component 202 is configured to transfer the identified network traffic situation (s) to the network traffic controller component 203. This can be done periodically or continuously. In particular, the information is transferred in form of a computer-readable representation. For example, the network traffic analyzer component 202 may produce a JSON or XML-based output.

In other words, the network traffic analyzer component 202 (periodically or continuously) sends the results of the analysis performed with the aid of the one or more first data analytics models 205 on the derived network traffic situation to the network traffic controller component 203.

In an embodiment, the network traffic controller component 203 can be based on or comprise a rule engine, complex event processing engine, constraint reasoner, temporal logic reasoner, description logics reasoner, simulation-based analyzer, statistical reasoner, mathematical optimizer, neural network classifier or on a combination of one or multiple thereof.

In an embodiment, the network traffic controller component 203 resides at a IIoT/edge device or at one of the IIoT/edge devices and is configured to use the at least one second data analytics model 206 to control the network traffic inbound to and/or outbound from the one or more of the IIoT/edge devices 101 and/or the traffic on the one or more of the IIOT/edge devices 101 (on-device traffic).

FIG. 1, FIG. 2 and FIG. 3 illustrate the network traffic controller component 203 comprising three interfaces 203a, 203b, 203c, wherein each interface can be used to allow data transfer without any restrictions, to block data transfer entirely or to transform the data in some way before transferring it. The interface 203a is an interface to the OT network 110, in particular to the OT data sink 113; the interface 203b is an interface to the applications 103 within the device 101; the interface 203c is an interface to the IT network 120, in particular to the OT data sink 123.

In an embodiment, the communication links between the OT network 110, the device 101 and the IT network 120 can be protected by cryptographic means. E.g. the information flow can be encoded by way of public-key cryptography or some similar method.

The network traffic controller component 203 uses the data received from the network traffic analyzer component 202 (identified network traffic situation) as an input data to the one or more second data analytics models 206 which output one or more rules or instructions on how to proceed with the network traffic within the scope of the identified network traffic situation. These instructions can comprise instructions associated with actions to be performed on the network traffic. Furthermore, the network traffic controller component 203 is configured to control the network traffic according to the one or more instructions/rules.

In other words, based on the data/information associated with the classification of the at least one network traffic situation received from the network traffic analyzer component 202, the network traffic controller component 203 controls the network traffic in the corresponding network traffic situations according to the output of the one or more second data analytics models 206.

As mentioned above, the network traffic controller component 203 can receive the input from the network traffic analyzer component 202 periodically or continuously. This may improve the functionality and quality of control of the network traffic. The functionality and quality depend on the analysis of past, current and/or predicted future network traffic situation (s) and optionally on correlations between multiple network traffic situation (s).

Sending (periodically or continuously) the data associated with the identified network traffic situations from the network traffic analyzer component 202 allows to configure the network traffic controller component 203 and to improve the control of the network traffic.

The result of this configuration process is the network traffic controller component 203 that executes the one or more second data analytics models 206, which define one or multiple control policies, once/periodically/continuously for each new/existing network traffic. A control policy (set of rules, weights for a neural network) can allow to dynamically transform traffic by removing parts of the transferred Industrial IoT data or by reducing the quality of Industrial IoT data (e.g. reduce data resolution in data streams such as video camera image streams, timeseries data streams, event data streams, and set an optional data quality field to the new resolution value and an optional reason field containing the reason for quality reduction for transparency reasons) or block/postpone selected traffic.

In summary, the network traffic control system 200 allows to perform a proper identification and control of different classes (situations) of network transfers to correctly assess and distinguish between different types of network traffic.

In an embodiment, there are two types of the network traffic. Type-1 traffic is a type is of potentially time-critical (w.r.t. shopfloor functionality) importance for the functionality of the system including critical IIoT/edge applications based on must-have network traffic scenarios (e.g. edge device inbound traffic with high frequency, high quality motion control or drive train data) as basis for operations. Improper context-awareness of a networking situation and inadequate controllability may negatively affect data security and/or stability of the edge computing platform and applications in terms of network-load characterized by data frequency and bandwidth, jitter and latency.

Type-2 traffic regards to all other network traffic that is not time-critical for edge computing functions such as best-effort data imports from customer systems (e.g. maintenance tasks), best-effort imports of background information for improving data analysis (e.g. external CAD/CAM models), or best-effort Web-based access for accessing data from Ecosystem applications running on the Siemens IIOT/Edge computing platforms (e.g. downloads of 2D/3D graphs and PDF reports). As the combination of multiple type-2 traffic requests may lead to a type-1 traffic situation it is desirable to correctly understand and assess the contribution of each single traffic to an overall network traffic situation including erroneous and potentially malicious network traffic.

To be able to classify the Type-1 traffic is important, e.g. in order to be able to distinguish between a valid high frequency machine tool data transfer and an invalid overload situation such as an erroneous IIoT/edge device application running high frequency traffic congesting I/O resources and leading to a potential unavailability of critical functions.

The following description is essentially limited to the differences from the exemplary embodiment in FIG. 1, reference being made to the description of the exemplary embodiment in FIG. 1 with regard to system that remain the same.

FIG. 2 shows the system 100 of FIG. 1, wherein the policy definition authority component 201 provides the same set of rules 205, 206 to the network traffic analyzer component 202 and to the network traffic controller component 203. The set comprises two rules:

1) Allow periodic downloads of big data chunks where downloads must follow each other with at least 5 minutes latency, and
2) Block all other traffic.

The OT network 110 is designed as a machine network and the IT network 120 is designed as a factory network. The OT device 111 can be designed as a machine tool that can comprise a control unit and a connector device for high-frequency machine data transfer. The web client 121 in the factory network 120 may continuously request monitoring reports.

The machine data source 110 provides Type-1 traffic, i.e. high-frequency machine tool data (streaming) to the network traffic analyzer component 202. This data is further requested by an application 103 running on the device 101. It will be appreciated that requesting and streaming the data goes through the network traffic analyzer component 202 and the network traffic controller component 203. E.g. the data stream to the app 103 goes through the interface 203b of the network traffic controller component 203.

The application 103 running on the device 101 can be a 3rd party app (i.e. an app developed by neither of the entities governing machine and/or factory networks nor the entity governing the device). The application 103 can be a 3rd party high-frequency machine data monitoring app. The app 103 can comprise a webserver for downloading monitoring reports from the machine network 110.

After analyzing the network traffic according to the rules provided by the policy definition authority component 201 the network traffic analyzer component 202 identifies the following network traffic situation "3rd Party Edge application 103 is continuously receiving high quality data from a machine 111 on the OT network 110; There is request for a batch-based download of a large file from the 3rd party app 103 by a Web client 121 in the IT (factory) network 120" and passes this information to the network traffic controller component 203. The first data analytics model 205 and the second data analytics model 206 can be based on a rule engine in this case.

Under the conditions set out by the policy definition authority component 201 and based on the identified network traffic situation the network traffic controller component 203 can perform following actions on the network traffic.

Allow outbound file download via interface 203c to the Web client 123 in the factory network 120 with maximal bandwidth, do not transform or block the traffic, Block all other outbound traffic (e.g. traffic to machine tool data sink 113), Evaluate the situation again if a new traffic request is received or existing traffic characteristics are changed.

Turning to FIG. 3 the policy definition authority component 201 defines the following rules:

1) Allow all streaming traffic to clients as long as there is no overload situation,
2) On overload or if receiver is not authorized (data privacy): transform all outbound traffic to IT network by reducing data point frequency.

The OT network 110 can be designed as a machine network and the IT network 120 can be designed as a factory network. The OT device 111 can be designed as a machine tool that can comprise a control unit and a connector device for high-frequency machine data transfer. The web client 121 in the factory network 120 may continuously request high frequency and/or high quality data.

The analysis of the network traffic by the network traffic analyzer component 202 provides the following network traffic situation "3rd Party machine data monitoring application 103 is continuously receiving high quality data from a machine 111 on the Of network 110; There is request for high frequency transfer of high-quality data from the 3rd party app 103 by a Web client 121 in the IT (factory) network 120 that will lead to a network overload scenario or system instability".

Based on the above rules and the identified network traffic situation the network traffic controller component 203 controls the network traffic accordingly:

Transform and send via interface 203c: low-quality/low-frequency data transfer to the Web client 123 in the IT network 120 with restricted bandwidth, Block all other outbound traffic, Evaluate the situation again if a new traffic request is received or existing traffic characteristics are changed.

It will be appreciated that the quality of the analysis and control of the network traffic can be improved, if the data associated with the network data is used for improving the first data analytics model 205 and the second data analytics model 206 that are provided by the policy definition authority component 201. When available the improved models can be uploaded to the network traffic analyzer component 202 and/or to the network traffic controller component 203 and deployed there to replace the old models.

In an embodiment the network traffic analyzer includes or accesses a data repository (e.g. a file or database) for storing historic network traffic metrics/statistics that are used for improving the classification quality of the component based on historical information.

In an embodiment the network channels and/or the transferred data and/or the network statistics/metrics and/or the analytical models and/or the Network Traffic Controller 203 configuration by the Network Traffic Analyzer 202 component is protected for confidentiality reasons by cryptographic symmetric or asymmetric encryption for inbound, outbound and/or on-device data transfers.

Figure 4:
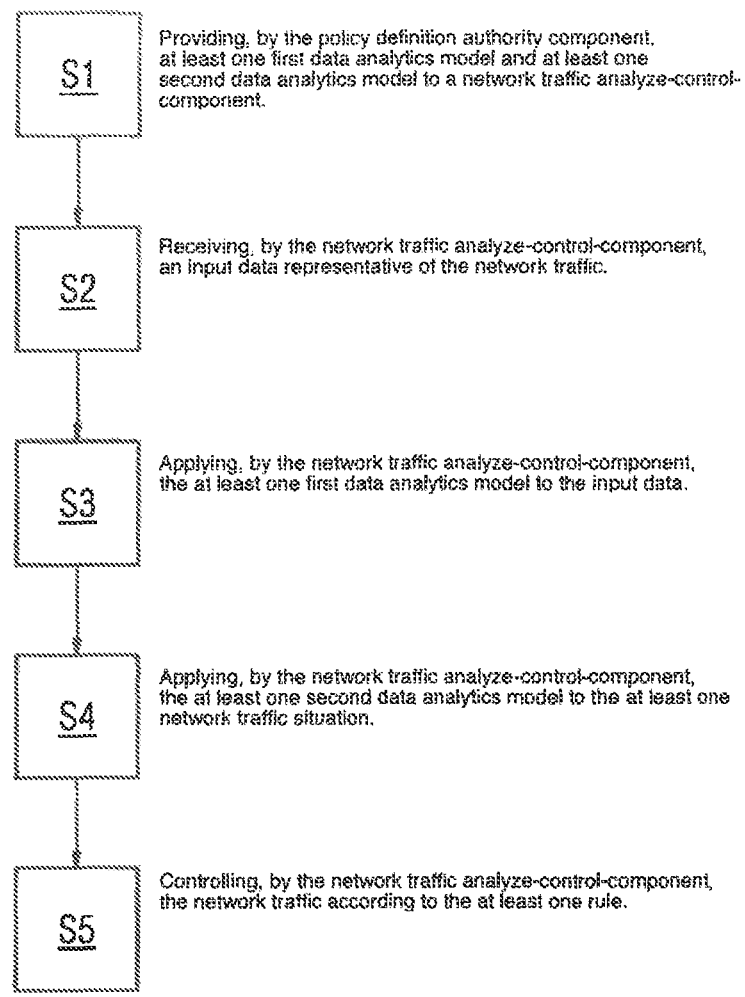

FIG. 4 shows a flow diagram of a method that can be carried out by a network traffic control system, e.g. by the network traffic control system 200 of FIGS. 1 to 3.

The method comprises—

Step S1—providing, by the policy definition authority component 201, at least one first data analytics model 205 and at least one second data analytics model 206 to a network traffic analyze-control-component, that can comprise the network traffic analyzer component 202 and the network traffic controller component 203, Step S2—receiving, by the network traffic analyze-control-component, an input data representative of the network traffic, Step S3—applying, by the network traffic analyze-control-component, the at least one first data analytics model 205 to the input data, wherein the at least one first data analytics model 205 identifies at least one network traffic situation.

Step S4—applying, by the network traffic analyze-control-component, the at least one second data analytics model 206 to the at least one network traffic situation, wherein the at least one second data analytics model 206 generates at least one rule according to which the network traffic can be controlled.

Step S5—controlling, by the network traffic analyze-control-component, the network traffic according to the at least one rule.

Figure 5:
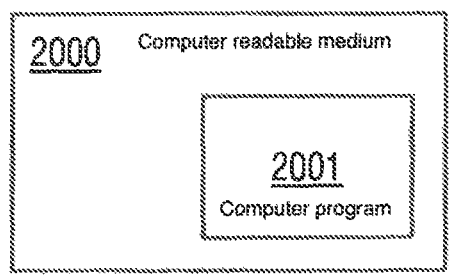

FIG. 5 shows computer-readable medium 2000 with a computer program 2001. The computer program 2001 comprises instructions which, when executed by the network traffic control system 200, cause the network traffic control system 200 to carry out the steps of the above-mentioned method.

The above-described embodiments of the present disclosure are presented for purposes of illustration and not of limitation. In particular, the embodiments described with regard to figures are only few examples of the embodiments described in the introductory part. Technical features that are described with regard to systems can be applied to augment methods disclosed herein and vice versa.

What is claimed is:

1. A system for analyzing and controlling network traffic associated with at least one device that resides between a first network and a second network, said system comprising:
   a memory designed to store machine-executable components; and
   a processor operatively coupled to the memory and configured to execute the machine-executable components, wherein the machine-executable components comprise a policy definition authority component and a network traffic analyze-control-component, wherein the policy definition authority component is configured to provide, to the network traffic analyze-control-component, at least one first data analytics model and at least one second data analytics model; and the network traffic analyze-control-component is configured to receive an input data comprising a network traffic data and a network traffic context data representative of a context within which the network traffic occurs, apply the at least one first data analytics model to the input data, wherein the at least one first data analytics model performs a context-based identification of at least one network traffic situation, apply the at least one second data analytics model to the at least one network traffic situation, wherein the at least one second data analytics model generates at least one rule according to which the network traffic can be controlled, and control the network traffic according to the at least one rule.

2. The system of claim 1, wherein the network traffic associated with the at least one device is network traffic inbound to, network traffic on and network traffic outbound from the at least one device.

3. The system of claim 1, wherein the network traffic data comprises at least one of bandwidth, jitter, frequencies of data loss, latencies, and network protocol.

4. The system of claim 1, wherein the network traffic context data comprises at least one of identification of a user that initiates the network traffic, license information associated with the network traffic, information associated with system environment, and outside temperature.

5. The system of claim 1, wherein the network traffic analyze-control-component comprises a network traffic analyzer component and a network traffic controller component, wherein the network traffic analyzer component is configured to apply the at least one first data analytics model to the input data, and the network traffic controller component is configured to apply the at least one second data analytics model to the at least one network traffic situation and to control the network traffic according to the at least one rule.

6. The system of claim 1, wherein the first data analytics model and/or second data analytics model are/is trained or defined on historical network traffic data.

7. The system of claim 1, wherein the at least one first data analytics model analyses statistical and/or stochastic and/or temporal correlations of the network traffic to identify the at least one network traffic situation.

8. The system of claim 1, wherein the at least one network traffic situation comprises streaming continuous high-frequency sensor data from the first network to the system and/or requesting, by the second network, a file download from the system.

9. The system of claim 1, wherein the first data analytics model and/or second data analytics model are/is based on or comprise a rule engine, complex event processing engine, constraint reasoner, temporal logic reasoner, description logics reasoner, simulation-based analyzer, statistical reasoner, mathematical optimizer, neural network classifier or on a combination of one or multiple thereof.

10. The system of claim 1, wherein the network traffic analyze-control-component is configured to receive the input data continuously in an input data stream and/or in form of batches of input data, and while receiving the input data, run the at least one first data analytics model on the input data, wherein the at least one first data analytics model determines correlations between the network traffic and a past and/or a current and/or an anticipated network traffic.

11. The system of claim 1, wherein the network traffic analyze-control-component comprises or is configured to access a data repository for storing historic network traffic metrics and/or statistics that are used for improving an identification quality based on historical information.

12. A computer implemented method for analyzing and controlling network traffic associated with at least one device that resides between a first network and a second network, said method comprising:
   providing a memory that stores machine-executable components;
   providing a processor that is operatively coupled to the memory, and is configured to execute the machine-executable components, wherein the machine-executable components comprise a policy definition authority component and a network traffic analyze-control-component;
   providing, by the policy definition authority component, at least one first data analytics model and at least one second data analytics model to the network traffic analyze-control-component;
   receiving, by the network traffic analyze-control-component, an input data comprising a network traffic data and a network traffic context data representative of a context within which the network traffic occurs;
   applying, by the network traffic analyze-control-component, the at least one first data analytics model to the input data, wherein the at least one first data analytics model performs a context-based identification of at least one network traffic situation;
   applying, by the network traffic analyze-control-component, the at least one second data analytics model to the at least one network traffic situation, wherein the at least one second data analytics model generates at least one rule according to which the network traffic can be controlled; and controlling, by the network traffic analyze-control-component, the network traffic according to the at least one rule.

13. A computer program product comprising:
a non-transitory computer-readable storage medium storing a computer program comprising instructions which, when the computer program is executed by a computing system, cause the computing system to execute machine-executable components, wherein the machine-executable components comprise a policy definition authority component and a network traffic analyze-control-component; to provide, by the policy definition authority component, at least one first data analytics model and at least one second data analytics model to the network traffic analyze-control-component; to receive, by the network traffic analyze-control-component, an input data comprising a network traffic data and a network traffic context data representative of a context within which network traffic occurs; to apply, by the network traffic analyze-control-component, the at least one first data analytics model to the input data, wherein the at least one first data analytics model performs a context-based identification of at least one network traffic situation; to apply, by the network traffic analyze-control-component, the at least one second data analytics model to the at least one network traffic situation, wherein the at least one second data analytics model generates at least one rule according to which the network traffic can be controlled; and to control, by the network traffic analyze-control-component, the network traffic according to the at least one rule.

* * * * *